United States Patent
Hikita

(10) Patent No.: US 9,290,063 B2
(45) Date of Patent: Mar. 22, 2016

(54) MOTORCYCLE TIRE FOR UNEVEN TERRAIN

(75) Inventor: Masahiro Hikita, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 13/470,446

(22) Filed: May 14, 2012

(65) Prior Publication Data

US 2012/0312436 A1    Dec. 13, 2012

(30) Foreign Application Priority Data

Jun. 10, 2011   (JP) .................................. 2011-129872

(51) Int. Cl.
*B60C 9/09* (2006.01)
*B60C 9/18* (2006.01)
*B60C 9/28* (2006.01)
*B60C 15/06* (2006.01)
*B60C 15/00* (2006.01)
*B60C 9/08* (2006.01)

(52) U.S. Cl.
CPC ......... *B60C 15/0603* (2013.04); *B60C 15/0045* (2013.04); *B60C 9/08* (2013.01); *B60C 15/0036* (2013.04); *B60C 2015/009* (2013.04); *B60C 2015/0614* (2013.04); *B60C 2200/10* (2013.04); *B60C 2200/14* (2013.04)

(58) Field of Classification Search
CPC .......................... B60C 15/0036; B60C 15/0045
USPC ............. 152/209.11, 548, 552, 554, 526, 538
IPC ........................................ B60C 9/02, 9/04, 9/08
See application file for complete search history.

(56) References Cited

U.S. PATENT DOCUMENTS

| | | | | |
|---|---|---|---|---|
| 3,506,052 | A | * | 4/1970 | Wittneben ..................... 152/535 |
| 3,951,191 | A | * | 4/1976 | Suzuki et al. ............... 152/209.2 |
| 4,311,179 | A | * | 1/1982 | Hayakawa et al. ...... 152/209.11 |
| 4,510,983 | A | * | 4/1985 | Ohkuni et al. ................ 152/526 |
| 4,784,200 | A | * | 11/1988 | Fujiwara .................. 152/209.18 |
| 4,966,215 | A | * | 10/1990 | Oka .............................. 152/538 |
| 5,783,004 | A | * | 7/1998 | Suzuki .......................... 152/534 |

(Continued)

FOREIGN PATENT DOCUMENTS

| | | |
|---|---|---|
| EP | 1475249 A1 | 11/2004 |
| EP | 2159075 A1 | 3/2010 |

(Continued)

OTHER PUBLICATIONS

Machine Translation: JP2608113B2; (no date).*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A tire 20 includes a tread 22, a pair of beads 26, a carcass 28, and a belt 30. A ply 56a of the carcass 28 includes: a body 58a that extends toward each bead 26; and a pair of turned-up portions 60a that extend approximately outward from the body 58a in the radial direction. The belt 30 includes a first layer 64a and a second layer 64b which are layered over each other in the radial direction. Ends 68b of the second layer 64b are located inwardly from ends 68a, respectively, of the first layer 64a in the axial direction. The tread 22 includes a plurality of blocks 42.

8 Claims, 4 Drawing Sheets

(56) References Cited

U.S. PATENT DOCUMENTS

| | | | |
|---|---|---|---|
| 2003/0047261 A1* | 3/2003 | Matsumura | 152/209.2 |
| 2005/0103419 A1* | 5/2005 | Yamamoto | 152/557 |
| 2006/0249238 A1 | 11/2006 | Maruoka et al. | |
| 2007/0102089 A1 | 5/2007 | Matsunaga | |
| 2007/0137757 A1* | 6/2007 | Roman | 152/554 |
| 2008/0245457 A1* | 10/2008 | Sueishi | 152/209.11 |
| 2008/0283168 A1 | 11/2008 | Matsumura | |
| 2009/0151844 A1* | 6/2009 | Miyazaki | 152/541 |
| 2010/0243117 A1* | 9/2010 | Daisho | 152/209.8 |
| 2011/0024009 A1* | 2/2011 | Nakamura | 152/209.1 |

FOREIGN PATENT DOCUMENTS

| | | | | |
|---|---|---|---|---|
| JP | 02225102 A | * | 9/1990 | |
| JP | 2608113 B2 | * | 5/1997 | |
| JP | 2000-211317 A | | 8/2000 | |
| JP | 2008-156417 A | | 7/2008 | |
| JP | 2008-308153 A | | 12/2008 | |
| JP | 2009196425 A | * | 9/2009 | B60C 11/04 |

OTHER PUBLICATIONS

Extended European Search Report dated Sep. 10, 2012, for Patent Application No. 12001180.4.

* cited by examiner

_US 9,290,063 B2_

MOTORCYCLE TIRE FOR UNEVEN TERRAIN

This application claims priority on Patent Application No. 2011-129872 filed in JAPAN on Jun. 10, 2011. The entire contents of this Japanese Patent Application are hereby incorporated by reference.

BACKGROUND OF THE INVENTION

1. Field of the Invention

The present invention relates to motorcycle tires for uneven terrain.

2. Description of the Related Art

FIG. 4 shows a conventional motorcycle tire 2. The tire 2 is used for running on uneven terrain such as mountain forests and wilderness. The tire 2 is for uneven terrain. The tire 2 includes a tread 4, sidewalls 6, beads 8, a carcass 10, and a belt 12.

The carcass 10 includes a first ply 14a and a second ply 14b. The first ply 14a and the second ply 14b each extend on and between the beads 8 located on both sides, and each extend under and along the tread 4 and the sidewalls 6. The first ply 14a and the second ply 14b are each turned up around each bead 8 from the inner side to the outer side in the axial direction.

The first ply 14a and the second ply 14b are each formed of multiple cords aligned with each other, and a topping rubber, which are not shown. An absolute value of an angle of each cord relative to the equator plane usually ranges from 65 degrees to 90 degrees. The carcass 10 has a radial structure.

The belt 12 is located outwardly of the carcass 10 in the radial direction. The belt 12 is layered over the carcass 10. The belt 12 reinforces the carcass 10. In the tire 2, a stiffness is high in a region of the tread 4. In the tire 2, a stiffness is low in regions of the sidewalls 6.

The tire 2 has a problem that load is concentrated on the regions of the sidewalls 6 having a low stiffness, and heat is likely to be generated in the regions of the sidewalls 6. In order to enhance the stiffness of the regions of the sidewalls 6, a turned-up structure of each ply 14 of the carcass 10 has been sometimes studied. An exemplary study thereof is disclosed in JP2007-131139 (US2007/0102089).

In uneven terrain, a road surface is uneven. A vehicle running on the uneven terrain repeats jumping and landing. To the tire 2 mounted to this vehicle, not only a great mechanical load is vertically applied, but also the load is frequently applied. Therefore, when a vehicle is running on the uneven terrain, heat is likely to be generated in the regions of the sidewalls 6 of the tire 2, as compared to when the vehicle is running on a general public road. The tire 2 has a problem that fatigue of the regions of the sidewalls 6 and deterioration in performance are accelerated.

In order to restrain increase of temperature in the regions of the sidewalls 6, a fin may be provided on the outer surface of the sidewall 6. However, the tire 2 cannot exert sufficient cooling effect.

In order to enhance a stiffness of the regions of the sidewalls 6, the first ply 14a and the second ply 14b may be each turned up such that ends 16a and 16b of the first ply 14a and the second ply 14b are located close to ends 18a and 18b of the belt 12. In this case, stiffness is excessively increased, to deteriorate handling stability.

An object of the present invention is to make available a motorcycle tire for uneven terrain which has its durability improved without deteriorating handling stability.

SUMMARY OF THE INVENTION

A motorcycle tire for uneven terrain according to the present invention includes: a tread having an outer surface which forms a tread surface; a pair of beads; a carcass which is located inwardly from the tread in a radial direction, and extends on and between one of the beads and the other of the beads; and a belt located between the tread and the carcass. The carcass includes a carcass ply that is turned up around each bead. The carcass ply includes: a body that extends from an equator plane toward each bead; and a pair of turned-up portions that extend approximately outward from the body in the radial direction. The belt includes a first layer and a second layer that extend in an axial direction and that are layered over each other in the radial direction. Ends of the second layer are located inwardly from ends, respectively, of the first layer in the axial direction. The tread includes a plurality of blocks that extend approximately outward in the radial direction. The plurality of blocks include shoulder blocks that are located on outer sides in the axial direction, and a portion of each of the turned-up portions is layered over the first layer, and ends of the turned-up portions are located close to the ends, respectively, of the second layer, inwardly from the shoulder blocks in the radial direction. Each of the beads includes a core and an apex that extends outward from the core in the radial direction. The apex is formed of a crosslinked rubber composition. A complex elastic modulus of the apex is less than or equal to 40 MPa.

Preferably, in the motorcycle tire for uneven terrain, a loss tangent of the apex is less than or equal to 0.15.

Preferably, in the motorcycle tire for uneven terrain, a layered length by which each of the turned-up portions is layered over the first layer is greater than or equal to 5 mm, and is not greater than 20 mm.

Preferably, in the motorcycle tire for uneven terrain, a distance from each of the ends of the turned-up portions to a corresponding one of the ends of the second layer is greater than or equal to 0.1 mm, and is not greater than 5 mm.

DESCRIPTION OF THE PREFERRED EMBODIMENTS

The following will describe in detail the present invention based on preferred embodiments with reference to the accompanying drawing.

Figure 1:
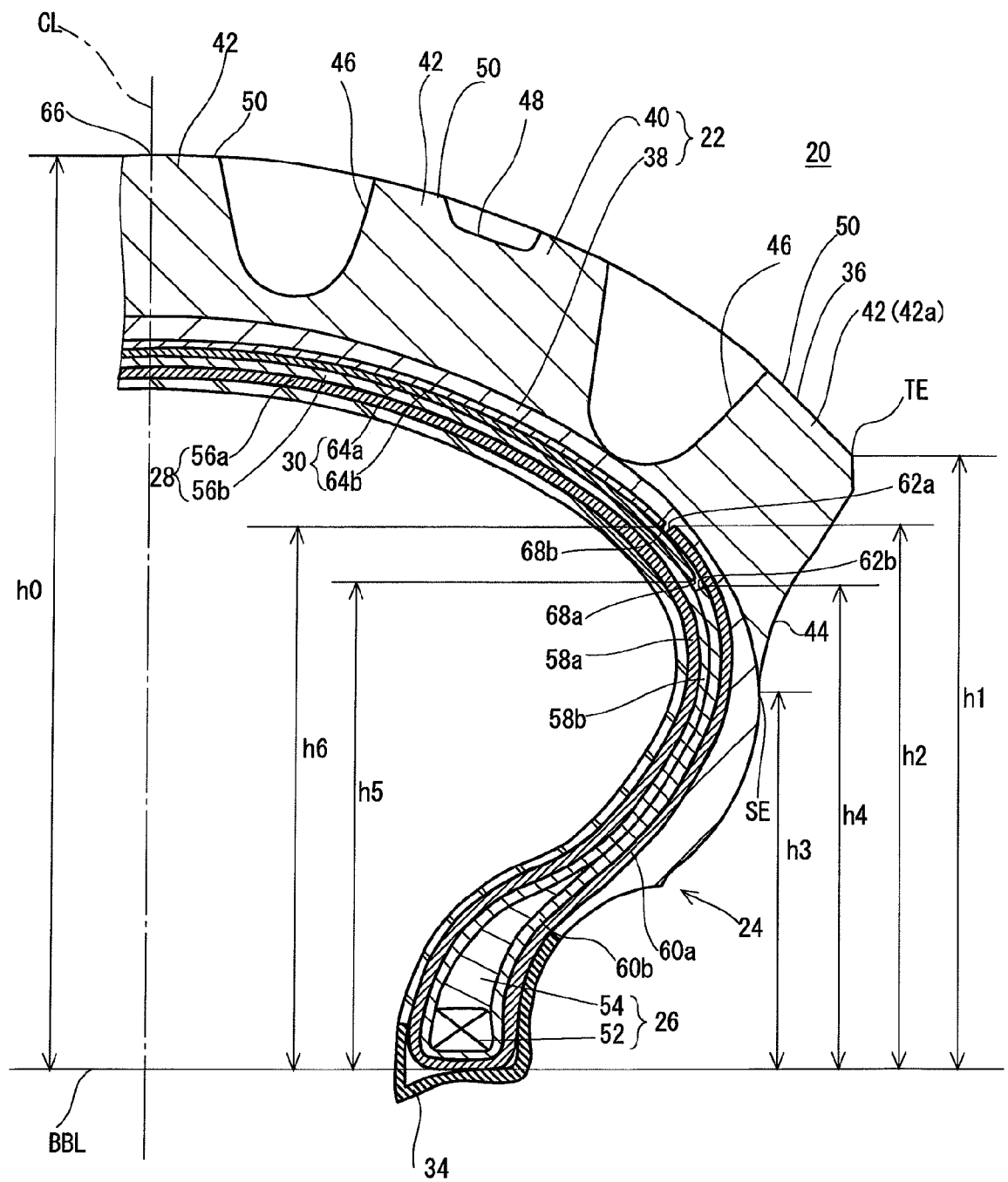
FIG. 1 is a cross-sectional view of a portion of a motorcycle tire for uneven terrain according to an embodiment of the present invention.

A tire 20, for use in motorcycles, as shown in FIG. 1 is used for running on uneven terrain such as mountain forests and wilderness. The tire 20 is for uneven terrain. The tire 20 includes a tread 22, sidewalls 24, beads 26, a carcass 28, a belt 30, and chafers 34. The tire 20 is of a tube type. In FIG. 1, the upward/downward direction represents the radial direction, the leftward/rightward direction represents the axial direction, and the direction orthogonal to the surface of the sheet represents the circumferential direction. The tire 20 has a shape which is almost bilaterally symmetric about an alternate long and short dash line CL shown in FIG. 1. The alternate long and short dash line CL represents the equator plane of the tire 20.

The tread 22 has a shape projecting outward in the radial direction. The tread 22 includes a tread surface 36. The tread surface 36 can contact with a road surface. The tread 22 is formed of a base 38 and a body 40. The base 38 is formed of a crosslinked rubber. The body 40 is located outwardly of the base 38 in the radial direction. The body 40 is formed of a crosslinked rubber. The body 40 includes multiple blocks 42 extending approximately outward in the radial direction. On a flat and smooth road surface, the outer surfaces of the multiple blocks 42 mainly contact with the road surface. On a soft ground, a portion of the tire 20 is buried, and the multiple blocks 42 are used to remove mud. On the soft ground, the multiple blocks 42 contribute to traction. The multiple blocks 42 each have a height ranging from 6 mm to 16 mm.

Figure 2:
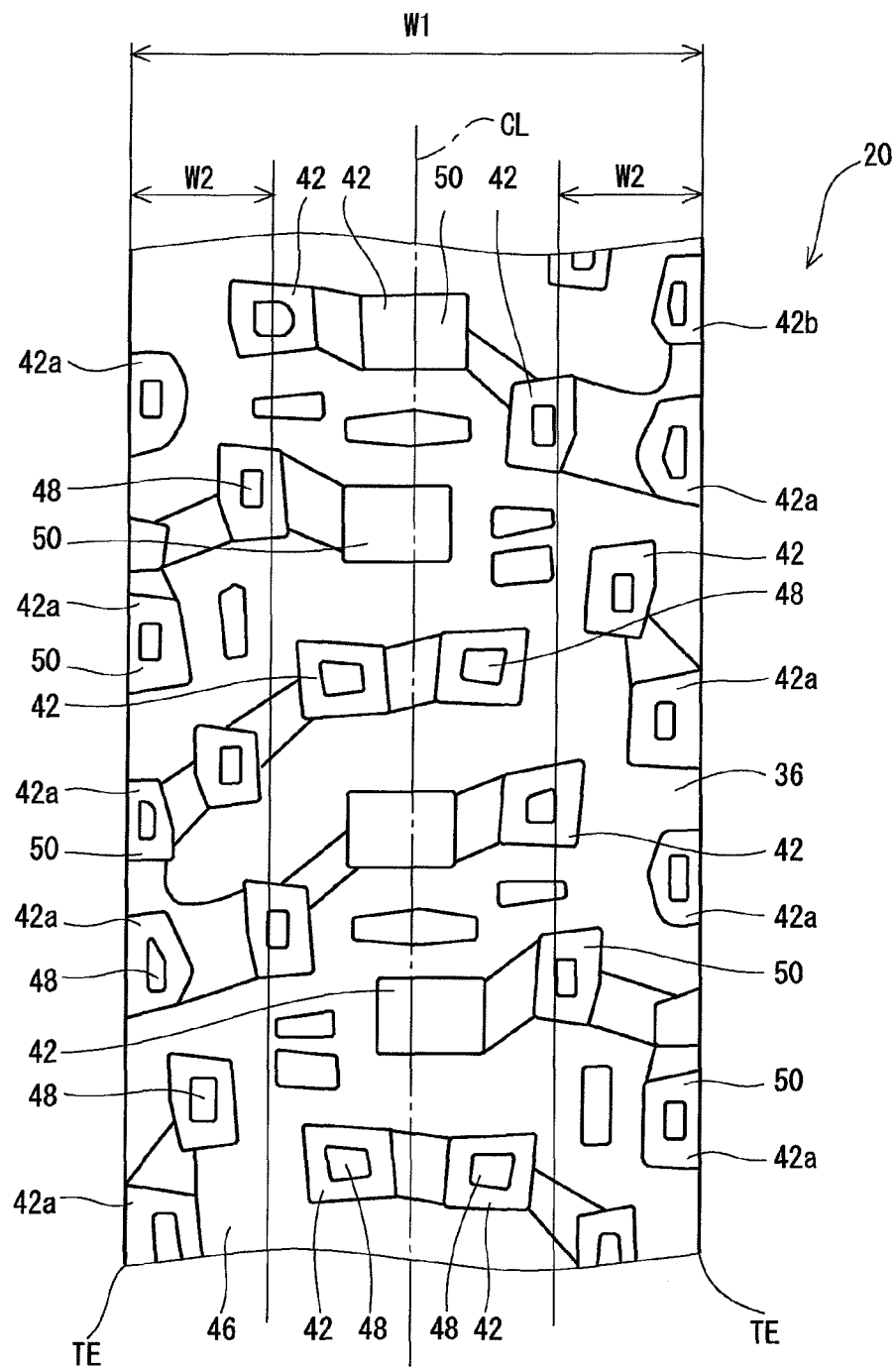
FIG. 2 is a development of a portion of a tread surface of the tire shown in FIG. 1.

FIG. 2 is a development of the tread surface 36 of the tire 20. In FIG. 2, the upward/downward direction represents the circumferential direction, and the leftward/rightward direction represents the axial direction. Reference character TE represents ends of the tread surface 36 in the axial direction. A double-headed arrow W1 represents a developed width of the tread surface 36. The developed width W1 is equal to the peripheral length from one of the ends TE of the tread surface 36 to the other of the ends TE of the tread surface 36. A double-headed arrow W2 represents a developed width of a shoulder region. The shoulder region is a region that extends from each end TE of the tread surface 36 toward the equator plane. In the tire 20, a ratio of the developed width W2 to the developed width W1 is 25%. Among the blocks 42 in each shoulder region, blocks located on the outer side in the axial direction are each referred to as a shoulder block 42a. The shoulder block 42a has a side surface 44 that extends approximately inward from the end TE of the tread surface 36, in the radial direction. In FIG. 1, an end of the side surface 44 on the inner side in the radial direction is represented by reference character SE.

As shown in the drawings, the blocks 42 adjacent to each other are separated by a groove 46. Portions, other than recesses 48, on the outer surfaces of the blocks 42 are each referred to as a land 50. The tread surface 36 of the tire 20 includes the lands 50, the grooves 46, and the recesses 48. In the development, a ratio of an area of the lands 50 to an area of the grooves 46 is referred to as a land to sea ratio. In the tire 20, in the viewpoint of durability and grip performance, the land to sea ratio preferably indicates a value that is greater than or equal to 10%, and is not greater than 30%.

The sidewalls 24 extend from the ends, respectively, of the tread 22 approximately inward in the radial direction. The sidewalls 24 are formed of a crosslinked rubber. The sidewalls 24 absorb impact from a road surface due to their flexibility. Further, the sidewalls 24 prevent injury of the carcass 28.

The beads 26 are located approximately inwardly from the sidewalls 24, respectively, in the radial direction. Each bead 26 includes a core 52, and an apex 54 extending from the core 52 outward in the radial direction. The core 52 is formed so as to be ring-shaped. The core 52 is formed so as to be wound with a non-stretchable wire. A steel wire is typically used for the core 52. The apex 54 is tapered outward in the radial direction.

The carcass 28 includes a first ply 56a and a second ply 56b. The first ply 56a and the second ply 56b each extend on and between the beads 26 located on both sides, and each extend under and along the tread 22 and the sidewalls 24. The first ply 56a is turned up around each core 52 from the inner side to the outer side in the axial direction. The first ply 56a includes: a first body 58a extending from the equator plane toward each bead 26; and a pair of first turned-up portions 60a each extending from the first body 58a approximately outward in the radial direction. The second ply 56b is layered over the first ply 56a. The second ply 56b is turned up around each core 52 from the inner side to the outer side in the axial direction. The second ply 56b includes: a second body 58b extending from the equator plane toward each bead 26; and a pair of second turned-up portions 60b each extending from the second body 58b approximately outward in the radial direction. The second body 58b is located outside the first body 58a. The second turned-up portions 60b are located inwardly from the first turned-up portions 60a in the axial direction. In the tire 20, ends 62b of the second turned-up portions 60b are located inwardly from ends 62a of the first turned-up portions 60a in the radial direction. The carcass 28 may be formed such that the ends 62b of the second turned-up portions 60b are located outwardly of the ends 62a of the first turned-up portions 60a in the radial direction.

Each of the first ply 56a and the second ply 56b includes multiple cords aligned with each other, and a topping rubber, which are not shown. An absolute value of an angle of each cord relative to the equator plane usually ranges from 65 degrees to 90 degrees. In other words, the carcass 28 has a radial structure. When the absolute value of the tilt angle indicates a value less than 90 degrees, a direction in which the cords of the first ply 56a tilt is opposite to a direction in which the cords of the second ply 56b tilt.

In the tire 20, the cords of each ply are typically formed of an organic fiber. Examples of preferable organic fiber include polyester fibers, nylon fibers, rayon fibers, polyethylene naphthalate fibers, and aramid fibers.

The belt 30 is located outwardly of the carcass 28 in the radial direction. The belt 30 is layered over the carcass 28. The belt 30 reinforces the carcass 28. The belt 30 includes an inner layer 64a and an outer layer 64b. The inner layer 64a and the outer layer 64b each extend in the axial direction. The inner layer 64a and the outer layer 64b are layered over each other in the radial direction. The inner layer 64a is layered over the carcass 28 so as to be located outwardly of the carcass 28 in the radial direction. The outer layer 64b is layered over the inner layer 64a so as to be located outwardly of the inner layer 64a in the radial direction.

Each of the inner layer 64a and the outer layer 64b includes multiple cords aligned with each other, and a topping rubber, which are not shown. Each cord tilts relative to the equator plane. An absolute value of the tilt angle indicates a value that is greater than or equal to 10 degrees, and is not greater than 35 degrees. A direction in which the cords of the inner layer 64a tilt is opposite to a direction in which the cords of the outer layer 64b tilt. For the cords, cords formed of an organic fiber are preferably used. A material of the cords may be a steel.

The chafers 34 are located near the beads 26, respectively. When the tire 20 is incorporated in a rim, the chafers 34 abut on the rim. Portions near the beads 26 are protected due to the abutment. The chafers 34 are typically formed of a fabric and a rubber impregnated into the fabric. The chafers 34 which are simply formed of a rubber may be used.

In FIG. 1, a solid line BBL represents a bead base line. The bead base line is a line that defines a diameter of a rim to which the tire 20 is mounted (see JATMA). A double-headed arrow h0 represents a height, in the radial direction, from the bead base line to an equator 66. The height h0 represents a height of a cross-section of the tire. A double-headed arrow h1 represents a height, in the radial direction, from the bead base line to the end TE of the tread surface 36. A double-headed arrow h2 represents a height, in the radial direction, from the bead base line to the end 62a of the first turned-up portion 60a which is a portion of the carcass 28. A double-headed arrow h3 represents a height, in the radial direction, from the bead base line to the end SE of the side surface 44 of the shoulder block 42a. A double-headed arrow h4 represents a height, in the radial direction, from the bead base line to the end 62b of the second turned-up portion 60b which is another portion of the carcass 28. A double-headed arrow h5 represents a height, in the radial direction, from the bead base line to an end 68a of the inner layer 64a which is a portion of the belt 30. A double-headed arrow h6 represents a height, in the radial direction, from the bead base line to an end 68b of the outer layer 64b which is another portion of the belt 30.

In the present invention, the dimensions and angles of the components of the tire 20 are measured in a state where the tire 20 is incorporated in a normal rim, and the tire 20 is filled with air so as to obtain a normal internal pressure. During the measurement, no load is applied to the tire 20. In the description of the present invention, the normal rim represents a rim which is specified according to the standard with which the tire 20 complies. The "standard rim" in the JATMA standard, the "Design Rim" in the TRA standard, and the "Measuring Rim" in the ETRTO standard are included in the normal rim. In the description of the present invention, the normal internal pressure represents an internal pressure which is specified according to the standard with which the tire 20 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure.

In the tire 20, the end 68b of the outer layer 64b is located inwardly from the end 68a of the inner layer 64a in the axial direction. The width of the outer layer 64b is smaller than the width of the inner layer 64a in the axial direction. In the tire 20, a region of the tread 22 has a shape projecting outward, and the height h6 is greater than the height h5. The belt 30 may be formed such that the width of the outer layer 64b is greater than the width of the inner layer 64a in the axial direction. In this case, the height h6 is less than the height h5.

In the tire 20, the height h6 is less than the height h1, and is greater than the height h3. In other words, the ends 68b of the outer layer 64b are located inwardly from each shoulder block 42a in the radial direction. Similarly, in the tire 20, the height h5 is less than the height h1, and is greater than the height h3. In other words, the ends 68a of the inner layer 64a are also located inwardly from each shoulder block 42a in the radial direction.

In the tire 20, the height h2 is less than the height h1, and is greater than the height h3. In other words, the ends 62a of the first turned-up portions 60a are located inwardly from each shoulder block 42a, in the radial direction. The first turned-up portions 60a extend along the sidewalls 24 approximately outward from the vicinities of the cores 52 of the beads 26, respectively, in the radial direction. The first turned-up portions 60a can contribute to stiffness of the regions of the sidewalls 24 of the tire 20. The tire 20 is excellent in durability.

In the tire 20, the height h4 is less than the height h1, and is greater than the height h3. In other words, the ends 62b of the second turned-up portions 60b are located inwardly from each shoulder block 42a, in the radial direction. The second turned-up portions 60b extend along the sidewalls 24 approximately outward from the vicinities of the cores 52, respectively, in the radial direction. The second turned-up portions 60b can contribute to stiffness of the regions of the sidewalls 24 of the tire 20. The tire 20 is excellent in durability.

In the tire 20, the ends 62a of the first turned-up portions 60a are located outwardly of the ends 62b of the second turned-up portions 60b, respectively, in the radial direction. Therefore, the height h4 is less than the height h2. In the tire 20, a portion of each of the first turned-up portions 60a extends beyond a corresponding one of the ends 62b of the second turned-up portions 60b. The carcass 28 may be formed such that a portion of each of the second turned-up portions 60b extends beyond a corresponding one of the ends 62a of the first turned-up portions 60a.

As shown in the drawings, the inner layer 64a and a portion of each of the first turned-up portions 60a are layered over each other. In the tire 20, the height h2 is greater than the height h5. Thus, concentration of mechanical load during running on uneven terrain is prevented. The tire 20 is excellent in durability. The tire 20 may be formed such that the outer layer 64b and a portion of each of the second turned-up portions 60b are layered over each other.

As described above, the ends 62a of the first turned-up portions 60a and the ends 68a of the inner layer 64a are located inwardly from each shoulder block 42a in the radial direction. Therefore, in the tire 20, portions in which the first turned-up portions 60a and the inner layer 64a are layered over each other are located inwardly from each shoulder block 42a in the radial direction.

In the tire 20, the shoulder blocks 42a have high stiffness. The shoulder blocks 42a enable concentration of mechanical load on the ends 62a of the first turned-up portions 60a, or the ends 68a of the inner layer 64a to be restrained. The shoulder blocks 42a can contribute to improvement of durability. In the tire 20, the layered portions are located inwardly from each shoulder block 42a in the radial direction, so that improvement of durability can be enhanced.

In the tire 20, the ends 62a of the first turned-up portions 60a are located close to the ends 68b, respectively, of the outer layer 64b. In the tire 20, the portion of the first turned-up portions 60a is not layered over the outer layer 64b. In the tire 20, excessive increase of stiffness is prevented in a boundary portion between each first turned-up portion 60a and the outer layer 64b. The boundary portion is not unique. In the boundary portion, concentration of mechanical load can be restrained. The boundary portion can contribute to improvement of durability. In the tire 20, the ends 62a of the first turned-up portions 60a are located close to the ends 68b, respectively, of the outer layer 64b, in order to enhance improvement of durability.

In the tire 20, the ends 62b of the second turned-up portions 60b are located close to the ends 68a, respectively, of the inner layer 64a. In the tire 20, the portion of the second turned-up portions 60b is not layered over the inner layer 64a. In the tire 20, excessive increase of stiffness is prevented in a boundary portion between each second turned-up portion 60b and the inner layer 64a. The boundary portion is not unique. In the boundary portion, concentration of mechanical load can be restrained. The boundary portion can contribute to improvement of durability. In the tire 20, the ends 62b of the second turned-up portions 60b are located close to the ends 68a, respectively, of the inner layer 64a, in order to enhance improvement of durability.

In the tire 20, the apex 54 of each bead 26 is formed of a crosslinked rubber composition. In the tire 20, a complex elastic modulus E* of the apex 54 is less than or equal to 40 MPa. The complex elastic modulus E* of the apex 54 is less than a complex elastic modulus E* of an apex of a conventional motorcycle tire for uneven terrain. The apex 54 enables excessive increase of stiffness in the regions of the sidewalls 24 of the tire 20 to be restrained. In the tire 20, excellent handling stability is maintained. In the tire 20, improvement of durability is achieved without deteriorating handling stability. In the viewpoint of providing appropriate stiffness, the complex elastic modulus E* of the apex 54 is preferably not less than 20 MPa.

In the present invention, the complex elastic modulus E1* of the apex 54, and a loss tangent (tan δ) of the apex 54 described below are measured, by using a viscoelastic spectrometer (manufactured by Iwamoto Seisakusho), in compliance with the standard of "JIS K 6394", under the following conditions.

Initial strain: 10%
Amplitude: ±2.0%
Frequency: 10 Hz
Deformation mode: tension
Measurement temperature: 70° C.

As described above, for the tire 20, the apex 54 having a low complex elastic modulus E* is used. In the tire 20, deformation caused by mechanical load is repeated in the region of each apex 54 during running. Therefore, in order to reduce heat generation caused by the repeated deformation, each apex 54 is preferably formed of a crosslinked rubber having a low loss tangent. Thus, in the tire 20, excellent handling stability is maintained, while reduction in durability which is caused by the repeated deformation of the apex 54 is prevented. In the tire 20, the loss tangent of each apex 54 is preferably less than or equal to 0.15, and is more preferably less than or equal to 0.10, and even more preferably less than or equal to 0.05.

In the tire 20, a rubber composition of each apex 54 contains a base rubber. Examples of the base rubber include natural rubbers (NR), epoxidized natural rubbers (ENR), polybutadienes (BR), styrene-butadiene copolymers (SBR), polyisoprenes (IR), isobutylene-isoprene copolymers (IIR), acrylonitrile-butadiene copolymers (NBR), polychloroprenes (CR), styrene-isoprene-butadiene copolymers (SIBR), styrene-isoprene copolymers, and isoprene-butadiene copolymers. In the viewpoint of a favorable tensile strength and a low heat generation, a natural rubber is preferably used as the base rubber. In the viewpoint of improvement of durability, a butadiene rubber is preferably used as the base rubber. In the viewpoint of resistance to aging, a styrene-butadiene rubber is preferably used as the base rubber. Two or more types of rubbers may be used in combination. In the tire 20, in the viewpoint of a low heat generation, durability, and resistance to aging, a natural rubber, a butadiene rubber, and a styrene-butadiene rubber are preferably used in combination. In this case, a natural rubber, a butadiene rubber, and a styrene-butadiene rubber are preferably blended in equal parts by mass.

In the tire 20, an amount of the natural rubber is preferably greater than or equal to 10 parts by mass, and is preferably not greater than 80 parts by mass, per 100 parts by mass of the base rubber. When the amount of the natural rubber is set to be greater than or equal to 10 parts by mass, per 100 parts by mass of the base rubber, the strength of each apex 54 is appropriately maintained, and heat generation caused due to each apex 54 being repeatedly deformed is reduced. In this viewpoint, the amount of the natural rubber is more preferably greater than or equal to 15 parts by mass, and is particularly preferably greater than or equal to 20 parts by mass, per 100 parts by mass of the base rubber. When the amount of the natural rubber is set to be not greater than 80 parts by mass, per 100 parts by mass of the base rubber, the stiffness of each apex 54 is appropriately maintained. Each apex 54 can contribute to handling stability. In this viewpoint, the amount of the natural rubber is more preferably not greater than 60 parts by mass, and is particularly preferably not greater than 40 parts by mass, per 100 parts by mass of the base rubber.

In the tire 20, an amount of the butadiene rubber is preferably greater than or equal to 10 parts by mass, and is preferably not greater than 80 parts by mass, per 100 parts by mass of the base rubber. When the amount of the butadiene rubber is set to be greater than or equal to 10 parts by mass, per 100 parts by mass of the base rubber, the apexes 54 having excellent flex-crack resistance can be formed. The apexes 54 can contribute to improvement of durability. In this viewpoint, the amount of the butadiene rubber is more preferably greater than or equal to 15 parts by mass, and is particularly preferably greater than or equal to 20 parts by mass, per 100 parts by mass of the base rubber. When the amount of the butadiene rubber is set to be not greater than 80 parts by mass, per 100 parts by mass of the base rubber, the apexes 54 excellent in processability can be formed. In this viewpoint, the amount of the butadiene rubber is more preferably not greater than 60 parts by mass, and is particularly preferably not greater than 40 parts by mass, per 100 parts by mass of the base rubber.

In the tire 20, an amount of the styrene-butadiene rubber is preferably greater than or equal to 10 parts by mass, and is preferably not greater than 80 parts by mass, per 100 parts by mass of the base rubber. When the amount of the styrene-butadiene rubber is set to be greater than or equal to 10 parts by mass, per 100 parts by mass of the base rubber, heat generation occurring during running is reduced, and change in physical property of each apex 54 due to mechanical load can be prevented. In this viewpoint, the amount of the styrene-butadiene rubber is more preferably greater than or equal to 15 parts by mass, and is particularly preferably greater than or equal to 20 parts by mass, per 100 parts by mass of the base rubber. When the amount of the styrene-butadiene rubber is set to be not greater than 80 parts by mass, per 100 parts by mass of the base rubber, heat generation occurring during running is reduced. In this viewpoint, the amount of the styrene-butadiene rubber is more preferably not greater than 60 parts by mass, and is particularly preferably not greater than 40 parts by mass, per 100 parts by mass of the base rubber.

In the tire 20, a carbon black may be blended with the rubber composition of the apexes 54. Thus, the strength of the rubber can be enhanced. Examples of the carbon black include GPF, HAF, ISAF, and SAF carbon blacks.

In the tire 20, when the carbon black is used, a nitrogen adsorption specific surface area of the carbon black is preferably greater than or equal to 30 $m^2/g$, and is preferably not greater than 160 $m^2/g$. When the nitrogen adsorption specific surface area is set to be greater than or equal to 30 $m^2/g$, reinforcement of the rubber tends to be improved. In this viewpoint, the nitrogen adsorption specific surface area is more preferably greater than or equal to 40 $m^2/g$. When the nitrogen adsorption specific surface area is set to be not greater than 160 $m^2/g$, an unvulcanized rubber composition has an appropriate viscosity, thereby improving processability. In this viewpoint, the nitrogen adsorption specific surface area is more preferably not greater than 150 $m^2/g$. The nitrogen adsorption specific surface area of the carbon black is obtained in compliance with the method A defined in JIS K 6217-2 and 3.

In the tire 20, an amount of the carbon black is preferably greater than or equal to 40 parts by mass, and is preferably not greater than 120 parts by mass, per 100 parts by mass of the base rubber. When the amount of the carbon black is set to be greater than or equal to 40 parts by mass, per 100 parts by mass of the base rubber, reinforcement of the rubber is improved. In this viewpoint, the amount of the carbon black is more preferably greater than or equal to 45 parts by mass, and is even more preferably greater than or equal to 50 parts by mass, per 100 parts by mass of the base rubber. When the amount of the carbon black is set to be not greater than 120 parts by mass, per 100 parts by mass of the base rubber, the processability is improved, and excessive increase of the stiffness of the apexes 54 is prevented. In this viewpoint, the amount of the carbon black is more preferably not greater than 100 parts by mass, and is even more preferably not greater than 90 parts by mass, per 100 parts by mass of the base rubber.

In the tire 20, the rubber composition of the apexes 54 may contain chemicals, which are typically used in the rubber industry, such as zinc oxide, stearic acid, an antioxidant, a mineral oil, a wax, an aliphatic petroleum resin, a vulcanizing agent like sulfur, and a vulcanization accelerator, as necessary, in addition to the base rubber and the carbon black.

Figure 3:
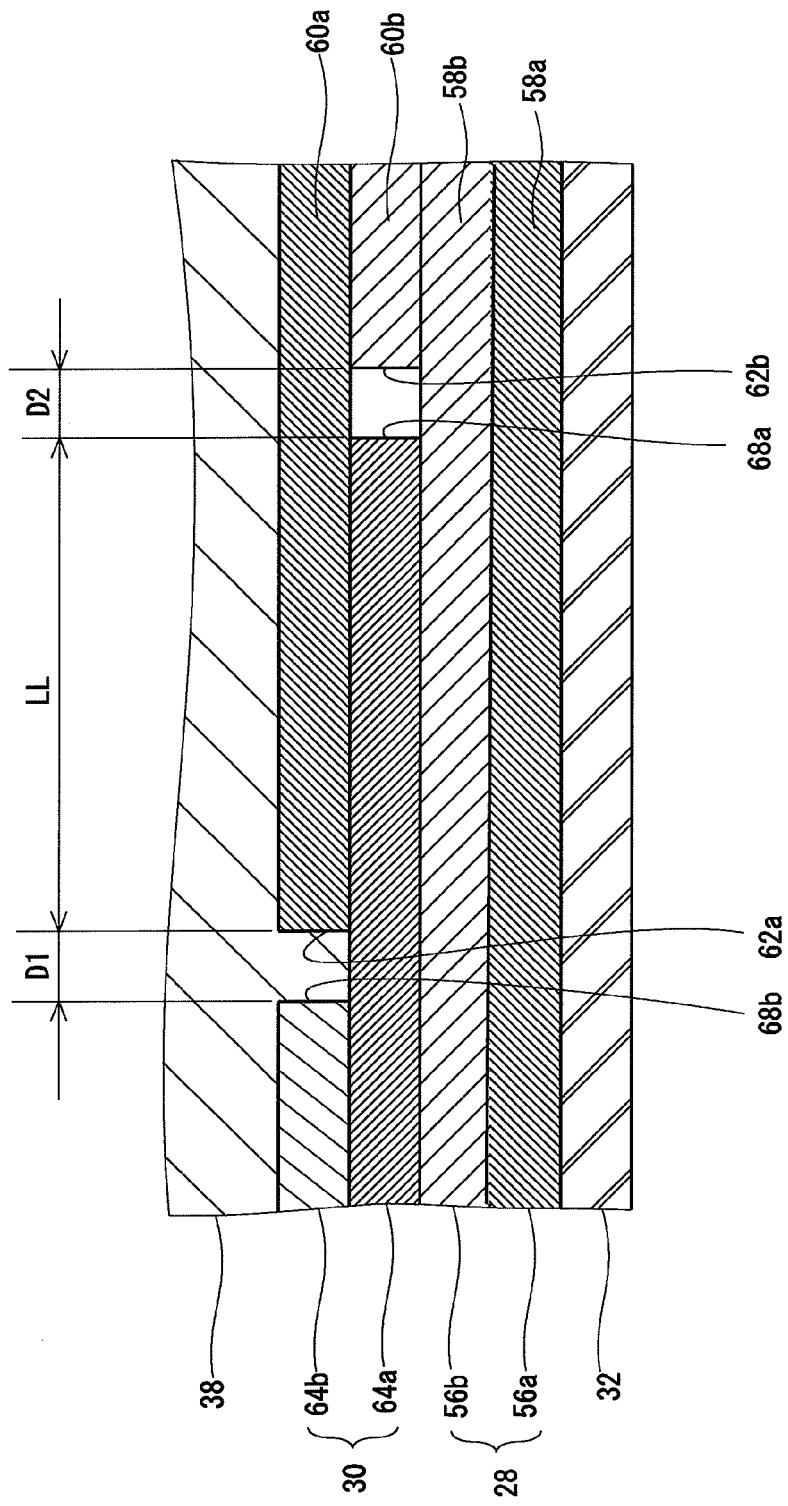
FIG. 3 is an enlarged cross-sectional view of a portion of the tire shown in FIG. 1.
Figure 4:
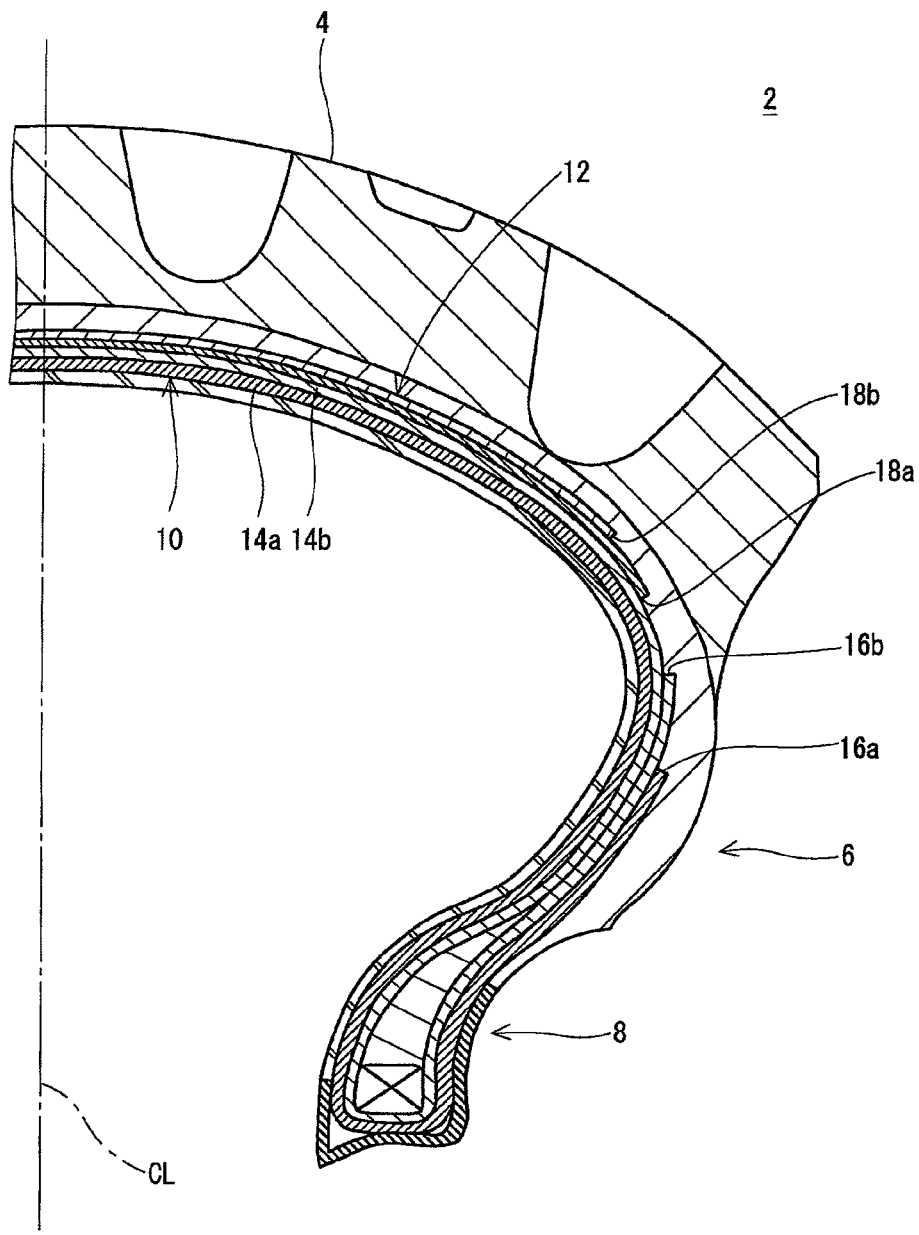
FIG. 4 is a cross-sectional view of a portion of a conventional motorcycle tire for uneven terrain.

In FIG. 3, a double-headed arrow LL represents a layered length by which the inner layer 64a and each of the first turned-up portions 60a are layered over each other. The layered length is measured along a boundary between each first turned-up portion 60a and the inner layer 64a. A distance D1 represents a distance from each of the ends 68b of the outer layer 64b to a corresponding one of the ends 62a of the first turned-up portions 60a. A distance D2 represents a distance from each of the ends 68a of the inner layer 64a to a corresponding one of the ends 62b of the second turned-up portions 60b.

In the tire 20, the layered length LL is preferably greater than or equal to 5 mm, and is preferably not greater than 20 mm. When the layered length LL is set to be greater than or equal to 5 mm, concentration of mechanical load can be restrained. The tire 20 is excellent in durability. In this viewpoint, the layered length LL is more preferably greater than or equal to 7 mm. When the layered length LL is set to be not greater than 20 mm, the stiffness of the tire 20 is appropriately maintained. The tire 20 is excellent in handling stability. In this viewpoint, the layered length LL is preferably not greater than 18 mm.

In the tire 20, the distance D1 is preferably less than or equal to 5 mm. When the distance D1 is set to be less than or equal to 5 mm, concentration of mechanical load in the boundary portion between each first turned-up portion 60a and the outer layer 64b is restrained. The boundary portion can contribute to improvement of durability. In this viewpoint, the distance D1 is preferably less than or equal to 3 mm. In order to prevent the outer layer 64b and each of the first turned-up portions 60a from being layered over each other, and appropriately maintain the stiffness in the boundary portion, the distance D1 is preferably not less than 0.1 mm.

In the tire 20, the distance D2 is preferably less than or equal to 5 mm. When the distance D2 is set to be less than or equal to 5 mm, concentration of mechanical load in the boundary portion between each second turned-up portion 60b and the inner layer 64a is restrained. The boundary portion can contribute to improvement of durability. In this viewpoint, the distance D2 is preferably less than or equal to 3 mm. In order to prevent the inner layer 64a and each of the second turned-up portions 60b from being layered over each other, and appropriately maintain the stiffness in the boundary portion, the distance D2 is preferably not less than 0.1 mm.

EXAMPLES

Hereinafter, effects of the present invention will become apparent according to examples. However, the present invention should not be restrictively construed based on the description of examples.

Example 1

100/3 parts by mass of a natural rubber ("RSS#3"), 100/3 parts by mass of a butadiene rubber (product name "BR150B", manufactured by Ube Industries, Ltd.), 100/3 parts by mass of a styrene-butadiene rubber (product name "SBR1502", manufactured by JSR Corporation), 73 parts by mass of a carbon black (product name "SHOBLACK (registered trademark) N550", manufactured by Cabot Japan K. K.), 20 parts by mass of calcium carbonate (product name "SL700", manufactured by SHIRAISHI CALCIUM KAISHA, LTD.), 9 parts by mass of zinc oxide (product name "zinc oxide Type 2", manufactured by HakusuiTech Co., Ltd.), 6.7 parts by mass of sulfur (product name "sulfur powder", manufactured by Tsurumi Kagaku), 2.2 parts by mass of a mineral oil (product name "AH-24", manufactured by Idemitsu Kosan Co., Ltd.), and 2.2 parts by mass of stearic acid (product name "stearic acid", manufactured by NOF CORPORATION) were kneaded, to obtain a rubber composition. Apexes were obtained by the rubber composition being extruded and formed, and the apexes and other rubber components were assembled, thereby obtaining a raw cover. The raw cover was put into a mold, and was pressurized and heated in the mold. Thus, a motorcycle tire (rear tire) for uneven terrain was obtained so as to have the fundamental structure shown in FIG. 1 and have the specifications indicated below in table 1. The size of the rear tire was 120/80-19 MX71. The complex elastic modulus E* of the apexes was 26 MPa, and the loss tangent (tan δ) thereof was 0.10. The carcass includes two plies. An absolute value of an angle of each cord included in each ply, relative to the equator plane, was 65 degrees. The belt includes an inner layer and an outer layer. An absolute value of an angle of each cord included in each layer, relative to the equator plane, was 25 degrees.

In Example 1, the height h0 of the cross-section of the tire was 102 mm. The height h1, in the radial direction, from the bead base line to the end TE of the tread surface was 67 mm. The height h2, in the radial direction, from the bead base line to the end of the first turned-up portion which was a portion of the carcass was 60 mm. The height h3, in the radial direction, from the bead base line to the end SE of the side surface of the shoulder block was 43 mm. The height h4, in the radial direction, from the bead base line to the end of the second turned-up portion which was another portion of the carcass was 54 mm. The height h5, in the radial direction, from the bead base line to the end of the inner layer which was a portion of the belt was 55 mm. The height h6, in the radial direction, from the bead base line to the end of the outer layer which was another portion of the belt was 61 mm. Thus, the layered length LL was 15 mm, the distance D1 was 1 mm, and the distance D2 was 1 mm.

Examples 2 to 18 and Comparative Example 2

Tires of Examples 2 to 18, and Comparative example 2 were obtained so as to have the same structure as that for Example 1 except that the height h2, the height h4, the height h5, or the height h6 were changed, and the layered length LL, the distance D1, and the distance D2 were as indicated below in tables 1 to 4. In Example 14, the first turned-up portions were each layered over not only the inner layer but also the outer layer. In Comparative example 2, the ends of the inner layer were located close to the ends of the second turned-up portions, respectively, and the ends of the outer layer were located close to the ends of the first turned-up portions, respectively, and the inner layer and each first turned-up portion were not layered over each other.

Examples 19 to 23 and Comparative Example 3

Tires of Examples 19 to 23 and Comparative example 3 were obtained so as to have the same structure as that for Example 1 except that a rubber composition of the apexes was changed, and the complex elastic modulus E* and the loss tangent (tan δ) were as indicated below in tables 4 and 5.

Comparative Example 1

A tire of Comparative example 1 was a conventional tire.
[Evaluation of Handling Stability and Durability]
Tires having been produced for these examples were each mounted to a rear wheel (rim size: WM2.15) of a two-wheeled vehicle (four stroke cycle) that was dedicated to motocross races and that had an engine displacement of 450 cc, and each tire was filled with air such that the internal pressure thereof became 80 kPa. A commercially available tire (size: 90/100-21 MX71F) was mounted to a front wheel (rim size: WM1.60), and the tire was filled with air such that the internal pressure thereof became 80 kPa. The two-wheeled vehicle was caused to run on a motocross course, and a sensory evaluation by a motocross rider was made. A 30 minutes running was performed four times in total. Results obtained in the first running and the fourth running are indicated below as indexes of handling stability in tables 1 to 5. The greater a value of the index is, the more favorable the handling stability is. Differences between a value of the index obtained in the first running and a value of the index obtained in the fourth running are indicated below as indexes of durability in tables 1 to 5. The smaller a value of the difference is, the more favorable the durability is.

TABLE 1

Evaluation results

| | | Comp. Example 1 | Example 2 | Example 3 | Example 4 | Example 1 | Example 5 |
|---|---|---|---|---|---|---|---|
| Layered length LL [mm] | | — | 3 | 5 | 7 | 15 | 18 |
| Height h1 [mm] | | 67 | 67 | 67 | 67 | 67 | 67 |
| Height h2 [mm] | | 37 | 60 | 60 | 60 | 60 | 60 |
| Height h3 [mm] | | 43 | 43 | 43 | 43 | 43 | 43 |
| Height h4 [mm] | | 46 | 59 | 58 | 57 | 54 | 50 |
| Height h5 [mm] | | 55 | 60 | 59 | 58 | 55 | 52 |
| Height h6 [mm] | | 61 | 61 | 61 | 61 | 61 | 61 |
| Distance D1 [mm] | | — | 1 | 1 | 1 | 1 | 1 |
| Distance D2 [mm] | | — | 1 | 1 | 1 | 1 | 1 |
| Apex | E* [MPa] | 54 | 26 | 26 | 26 | 26 | 26 |
| | tan δ | 0.15 | 0.10 | 0.10 | 0.10 | 0.10 | 0.10 |
| Handling | First running | 100 | 100 | 100 | 100 | 100 | 100 |
| stability | Fourth running | 85 | 95 | 97 | 98 | 98 | 98 |
| Durability | | 15 | 5 | 3 | 2 | 2 | 2 |

TABLE 2

Evaluation results

| | | Example 6 | Example 7 | Example 8 | Example 9 | Comp. Example 2 | Example 10 |
|---|---|---|---|---|---|---|---|
| Layered length LL [mm] | | 20 | 25 | 5 | 15 | — | 5 |
| Height h1 [mm] | | 67 | 67 | 67 | 67 | 67 | 67 |
| Height h2 [mm] | | 60 | 60 | 55 | 70 | 54 | 60 |
| Height h3 [mm] | | 43 | 43 | 43 | 43 | 43 | 43 |
| Height h4 [mm] | | 48 | 44 | 48 | 57 | 54 | 54 |
| Height h5 [mm] | | 50 | 46 | 50 | 58 | 55 | 55 |
| Height h6 [mm] | | 61 | 61 | 56 | 70 | 55 | 61 |
| Distance D1 [mm] | | 1 | 1 | 1 | 1 | 1 | 1 |
| Distance D2 [mm] | | 1 | 1 | 1 | 1 | 1 | 1 |
| Apex | E* [MPa] | 26 | 26 | 26 | 26 | 26 | 26 |
| | tan δ | 0.10 | 0.10 | 0.10 | 0.10 | 0.10 | 0.10 |
| Handling | First running | 95 | 90 | 95 | 90 | 95 | 95 |
| stability | Fourth running | 92 | 87 | 90 | 87 | 85 | 90 |
| Durability | | 3 | 3 | 5 | 3 | 10 | 5 |

TABLE 3

Evaluation results

| | Example 11 | Example 12 | Example 13 | Example 14 | Example 15 | Example 16 |
|---|---|---|---|---|---|---|
| Layered length LL [mm] | 10 | 20 | 25 | 15 | 15 | 15 |
| Height h1 [mm] | 67 | 67 | 67 | 67 | 67 | 67 |

TABLE 3-continued

Evaluation results

|  |  | Example 11 | Example 12 | Example 13 | Example 14 | Example 15 | Example 16 |
|---|---|---|---|---|---|---|---|
| Height h2 [mm] | | 63 | 66 | 67 | 60 | 60 | 60 |
| Height h3 [mm] | | 43 | 43 | 43 | 43 | 43 | 43 |
| Height h4 [mm] | | 54 | 54 | 54 | 54 | 54 | 54 |
| Height h5 [mm] | | 55 | 55 | 55 | 55 | 55 | 55 |
| Height h6 [mm] | | 64 | 67 | 68 | 58 | 60 | 62 |
| Distance D1 [mm] | | 1 | 1 | 1 | — | 0.1 | 3 |
| Distance D2 [mm] | | 1 | 1 | 1 | 1 | 1 | 1 |
| Apex | $E^*$ [MPa] | 26 | 26 | 26 | 26 | 26 | 26 |
| | $\tan\delta$ | 0.10 | 0.10 | 0.10 | 0.10 | 0.10 | 0.10 |
| Handling | First running | 95 | 95 | 90 | 98 | 100 | 100 |
| stability | Fourth running | 90 | 90 | 85 | 96 | 98 | 98 |
| Durability | | 5 | 5 | 5 | 2 | 2 | 2 |

TABLE 4

Evaluation results

|  |  | Example 17 | Example 18 | Example 19 | Example 20 | Example 21 | Example 22 |
|---|---|---|---|---|---|---|---|
| Layered length LL [mm] | | 15 | 15 | 15 | 15 | 15 | 15 |
| Height h1 [mm] | | 67 | 67 | 67 | 67 | 67 | 67 |
| Height h2 [mm] | | 60 | 60 | 60 | 60 | 60 | 60 |
| Height h3 [mm] | | 43 | 43 | 43 | 43 | 43 | 43 |
| Height h4 [mm] | | 54 | 54 | 54 | 54 | 54 | 54 |
| Height h5 [mm] | | 55 | 55 | 55 | 55 | 55 | 55 |
| Height h6 [mm] | | 63 | 65 | 61 | 61 | 61 | 61 |
| Distance D1 [mm] | | 5 | 10 | 1 | 1 | 1 | 1 |
| Distance D2 [mm] | | 1 | 1 | 1 | 1 | 1 | 1 |
| Apex | $E^*$ [MPa] | 26 | 26 | 14 | 40 | 26 | 26 |
| | $\tan\delta$ | 0.10 | 0.10 | 0.10 | 0.10 | 0.050 | 0.15 |
| Handling | First running | 100 | 100 | 90 | 98 | 98 | 100 |
| stability | Fourth running | 98 | 92 | 88 | 95 | 95 | 96 |
| Durability | | 2 | 8 | 2 | 3 | 3 | 4 |

TABLE 5

Evaluation results

|  |  | Comp. Example 3 | Comp. Example 4 |
|---|---|---|---|
| Layered length LL [mm] | | 15 | 15 |
| Height h1 [mm] | | 67 | 67 |
| Height h2 [mm] | | 60 | 60 |
| Height h3 [mm] | | 43 | 43 |
| Height h4 [mm] | | 54 | 54 |
| Height h5 [mm] | | 55 | 55 |
| Height h6 [mm] | | 61 | 61 |
| Distance D1 [mm] | | 1 | 1 |
| Distance D2 [mm] | | 1 | 1 |
| Apex | $E^*$ [MPa] | 54 | 54 |
| | $\tan\delta$ | 0.10 | 0.15 |
| Handling | First running | 85 | 85 |
| stability | Fourth running | 82 | 80 |
| Durability | | 3 | 5 |

As indicated in table 1 to table 5, the evaluations of the tires of Examples are higher than those of the tires of Comparative examples. The evaluation results clearly indicate that the present invention is superior.

The tire as described above may be applied to various two-wheeled vehicles. The application of the tire as described above is merely an exemplary one.

The foregoing description is in all aspects illustrative, and various modifications can be devised without departing from the essential features of the invention.

What is claimed is:

1. A motorcycle tire for uneven terrain comprising: a tread having an outer surface which forms a tread surface; a pair of beads; a carcass which is located inwardly from the tread in a radial direction, and extends on and between each of the beads; and a belt located between the tread and the carcass, wherein
the carcass includes a first ply and a second ply which are turned up around each bead,
the first ply includes: a first body that extends from an equator plane toward each bead; and a pair of first turned-up portions that extend approximately outward from the first body in the radial direction,
the second ply includes: a second body that extends from the equator plane toward each bead; and a pair of second turned-up portions that extend approximately outward from the second body in the radial direction,
the belt includes a first layer and a second layer that extend in an axial direction and that are layered over each other in the radial direction, ends of the second layer are located inwardly from ends, respectively, of the first layer in the axial direction, and the end of the first layer is layered over the second body of the second ply,
the tread includes a plurality of blocks that extend approximately outward in the radial direction, separated from one another by grooves, some of which blocks may have recesses located in their surface, wherein the plurality of blocks are arranged so as to be intermittently divided from one another in a circumferential direction and an axial direction, and the plurality of blocks include shoulder blocks that are located on outer sides in the axial direction, wherein a land is defined as an area of a tread surface which is not recessed and a sea is defined as an area of the tread which is constituted by a groove and a land to sea ratio is equal to or greater than 10% and equal to or less than 30%, a portion of each of the first turned-up portions extends beyond a corresponding one of the ends of the second turned-up portions, the portion of each of the first turned-up portions is layered over the first layer, each of the first turned-up portions is not layered over the second layer, ends of the first turned-up portions are located close to the ends, respectively, of the second layer, and each of the second turned-up portions are located close to the ends, respectively, of the first layer, inwardly from the shoulder blocks in the radial direction, the ends of the first turned-up portions and the ends of the second turned-up portions and the ends of the first layer and the ends of the second layer are located between ends of the tread surface and ends of the side surfaces of the shoulder blocks, respectively, in the radial direction, each of the beads includes a core and an apex that extends outward from the core in the radial direction, the apex is formed of a crosslinked rubber composition, a complex elastic modulus of the apex is less than or equal to 40 MPa, a loss tangent of the apex is less than or equal to 0.10, and the second body is brought into contact with each of the second turned-up portions at an outer side of the apex in the radial direction, and said tire is suitable for use when an internal air pressure of the tire is 80 kPa.

2. The motorcycle tire for uneven terrain according to claim 1, wherein a layered length by which each of the first turned-up portions is layered over the first layer is greater than or equal to 5 mm, and is not greater than 20 mm.

3. The motorcycle tire for uneven terrain according to claim 2, wherein the layered length is greater than or equal to 7 mm and is not greater than 18 mm.

4. The motorcycle tire for uneven terrain according to claim 1, wherein a distance from each of the ends of the first turned-up portions to a corresponding one of the ends of the second layer is greater than or equal to 0.1 mm, and is not greater than 5 mm.

5. The motorcycle tire for uneven terrain according to claim 1, wherein a distance from each of the ends of the second turned-up portions to a corresponding one of the ends of the first layer is greater than or equal to 0.1 mm and is not greater than 5 mm.

6. The motorcycle tire for uneven terrain according to claim 1, wherein the rubber composition of the apex comprises a base rubber composed of at least two members selected from the group consisting of a natural rubber, a butadiene rubber, and a styrene-butadiene rubber.

7. The motorcycle tire for uneven terrain according to claim 1, wherein the rubber composition of the apex comprises a base rubber composed of a natural rubber, a butadiene rubber, and a styrene-butadiene rubber.

8. The motorcycle tire for uneven terrain according to claim 1, wherein each of the first ply and the second ply includes multiple cords formed of nylon fibers or polyester fibers.

* * * * *